INVENTOR
BERNARD M. OLIVER
ATTORNEY

United States Patent Office 3,283,242
Patented Nov. 1, 1966

3,283,242
IMPEDANCE METER HAVING SIGNAL
LEVELING APPARATUS
Bernard M. Oliver, Los Altos Hills, Calif., assignor to Hewlett-Packard Company, Palo Alto, Calif., a corporation of California
Continuation of application Ser. No. 169,865, Jan. 30, 1962. This application Dec. 8, 1965, Ser. No. 520,019
5 Claims. (Cl. 324—57)

This application is a continuation of pending U.S. patent application Serial Number 169,865, filed January 30, 1962, and now abandoned, and entitled Impedance Meter.

This invention relates to an impedance measuring circuit which provides direct indications of impedance at selected frequencies and which obviates the need for making separate current and voltage measurements and for removing the components to be tested from the surrounding circuitry.

Certain impedance measuring techniques are widely used in circuit testing applications where it is desirable to know the impedance present at a test node at a selected frequency. For example, it is frequently desirable to determine the impedance characteristics with frequency of a coupling circuit in a cascaded amplifier. One known method of measuring impedance uses a voltmeter and a current-responsive meter inserted in the circuit under test to obtain current and voltage readings at selected frequencies. The disadvantages inherent in this method include the fact that the current may divide into many paths at the test node so the only way to measure the current is with a floating meter in the test lead. Further one must calculate the impedance at each of the selected frequencies. Other known methods, such as the use of an impedance bridge, may require the isolation of the components to be tested. Such methods are slow and often yield inaccurate results because the components are not tested under actual operating conditions. It is thus desirable to have a device which directly reads the impedance to ground at any selected frequency simply when touched to the node under test.

Accordingly, it is an object of the present invention to provide an impedance measuring device which reads impedance directly upon merely touching a probe to the test node.

It is another object of the present invention to provide an impedance measuring device which avoids having to make separate measurements of load current and load voltage.

It is still another object of the present invention to provide an impedance measuring circuit which measures the component in situ.

In accordance with the illustrated embodiment of the present invention, a source of alternating current is connected to the load to be tested through a probe which includes a current transformer and means to sense the applied voltage. The alternating current is applied through one conductor of the probe to the load under test, which conductor constitutes a primary winding of the current transformer. The secondary winding of the current transformer is returned through a second conductor of the probe to a circuit which controls the amplitude of the alternating current applied to the load. The voltage produced across the load is returned through a third conductor of the probe to a voltmeter calibrated to read directly in impedance.

Other and incidental objects of the present invention will be apparent from a reading of this specification and an inspection of the accompanying drawing in which.

Figure 1:
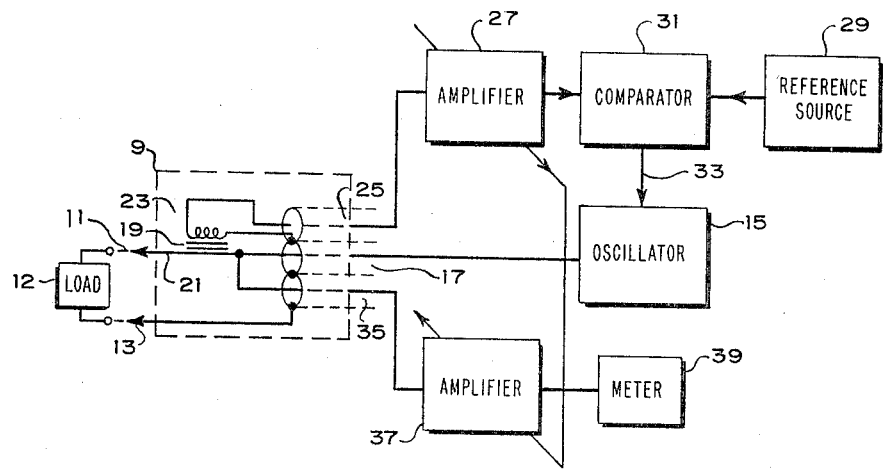
FIGURE 1 is a schematic diagram of the circuit of the present invention.

Referring now to FIGURE 1 there is shown a probe 9 having probe terminal 11 and ground terminal 13. Alternating current from oscillator 15 is applied through coaxial cable 17 to the probe terminal 11. The current transformer 19 comprises a one-turn primary winding, conductor 21, and secondary winding 23. This transformer provides a first output signal which is returned through coaxial cable 25 to the amplifier 27. The output of amplifier 27 is applied to one input of comparator 31. The output of reference source 29 is applied to the other input of comparator 31. The output of comparator 31 is applied through conductor 33 to a control element in oscillator 15. Oscillator 15 typically is tunable over a wide range of frequencies. The voltage appearing between terminals 11 and 13 of probe 9 is returned through coaxial cable 35 to amplifier 37, the output of which is applied to meter 39.

In operation, the load 12 to be tested is connected between probe terminal 11 and the ground or reference terminal 13. Alternating current from oscillator 15 is applied to the load 12 through the coaxial cable 17. A signal proportional to the current flowing in the load circuit is returned to amplifier 27 through the coaxial cable 25. The output of amplifier 27 is rectified and compared with the reference source 29 in comparator 31. The error signal obtained as the difference between the voltages applied to the inputs of comparator 31 is used to control the amplitude of the alternating current provided by oscillator 15. The current applied to the load circuit is thus maintained substantially constant at some predetermined value for each measuring range.

At the same time, the voltage appearing across the load under test is returned to amplifier 37 through coaxial cable 35. The output of amplifier 37 is applied to meter 39 which provides a direct indication of the voltage across the load under test. Since the current in the load under test is maintained substantially constant, the voltage across the load is proportional to the impedance. Meter 39 is calibrated directly in impedance, and thus provides a direct indication of the impedance of the load under test. The gains of amplifiers 27 and 37 are adjustable in steps to provide successive ranges of impedance measurements.

A dual result may be obtained by maintaining the voltage across the load under test substantially constant and by metering the load current. The reading in this case is a direct indication of load admittance. Specifically, a measurement may be obtained in this manner by comparing the rectified output of amplifier 37 with the reference source in comparator 31. The error signal obtained in this manner maintains the voltage at the output of oscillator 15 substantially constant. The direct indication of admittance is obtained by metering the output of amplifier 27, which output is proportional to load current. Since admittance and impedance are reciprocally related, any discussion herein of measurement of either quantity should be taken to be applicable to the other.

Figure 2:
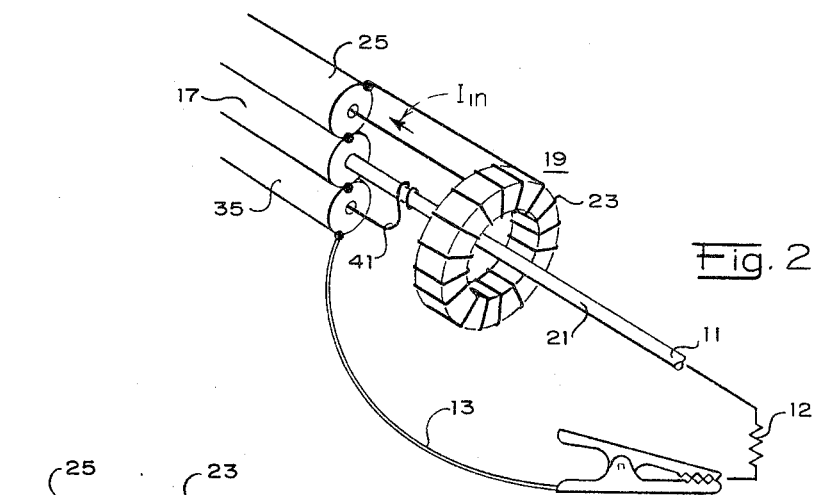
FIGURE 2 is a perspective view of the measuring probe of the present invention.

Referring now to FIGURE 2, the meter probe 9 of FIGURE 1 is shown in perspective view. Current from the oscillator 15 is applied through conductor 21 to the load 12. This conductor constitutes a one-turn primary winding for the current transformer 19. If the secondary winding 23 has N turns, then the signal returned through coaxial cable 25 is $1/N$ times the load current. The primary winding may include more than one turn, especially in low frequency applications where high inductive coupling is desired.

The voltage appearing across load 12 is obtained at connection 41 and is returned through coaxial conductor 35 to a sensitive voltmeter circuit. By sampling both the load current and load voltage substantially at the point where the load under test is connected to the probe, the effects of voltage drop along the probe cables, of distributed capacity, and of other factors upon the accuracy of the measurement are materially reduced.

Figure 3:
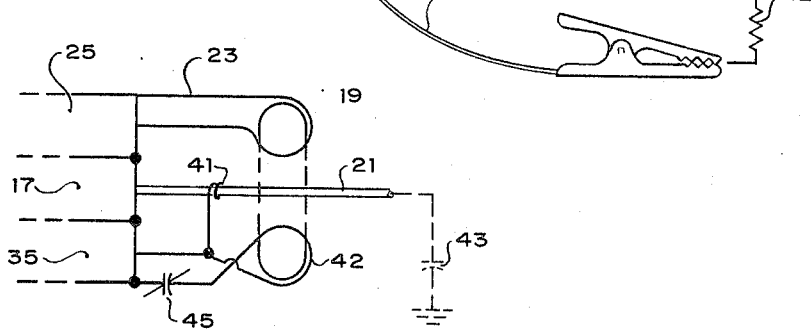
FIGURE 3 is a schematic diagram showing a modification of the measuring probe of FIGURE 2.

Referring now to FIGURE 3, there is shown a schematic diagram of a circuit modification of the probe shown in FIGURE 2. The modification adds to the current transformer 19 a one-turn winding 42 connected to an adjustable capacitor 45. In general, this additional winding has a number of turns equal to the number of turns in the primary winding. This circuit compensates for the current drawn by distributed capacity 43 at high frequencies. The effect of the load current in conductor 21 due to the distributed capacity 43 is canceled by the effect of the current in the one-turn winding 42 due to capacitor 45. Another modification of the probe of FIGURE 2 is made by extending the outer shield of cable 17 beyond the core of transformer 19. This modification reduces the distributed capacity between the primary winding and the transformer core. Of course, an opening in the shield is required for connection 41. For a multi-turn primary winding, the outer shield of the conductor is threaded through the transformer core along with the conductor.

The present invention provides a direct indication of driving point impedance simply by touching the probe to the load under test. In addition, rapid measurements may be made using the circuit of the present invention since the load under test need not be removed from the surrounding circuitry. Further, high accuracy measurements may be obtained over a wide range of test frequencies since the load current and voltage are measured at points electrically close to the load. This measurement accuracy is maintained even at extremely high frequencies in the circuit of the present invention by the use of a compensating circuit which eliminates the effects of distributed capacity upon the indication of impedance.

I claim:

1. Apparatus for measuring the impedance of a load, the circuit comprising:
   a probe including a pair of test terminals for receiving thereacross a load to be measured;
   a separate source of alternating signal having a selected frequency which is independent of load connected thereto;
   signal conducting means serially connecting said source and the test terminals of said probe for applying the alternating signal from said source to the load to be measured connected to said test terminal;
   means within said probe coupled to one of said test terminals for producing a first output in response only to the current flowing through a load to be measured connected to the test terminals;
   means within said probe coupled to said test terminals for producing a second output in response to the voltage across said test terminals;
   circuit means connected to said source and responsive to one of the first and second outputs for altering the amplitude of the alternating signal to maintain said one of the first and second outputs constant; and
   indicating means connected to receive the other of the first and second outputs for producing an indication of the magnitude thereof.

2. Apparatus as in claim 1 wherein the current flowing through the load to be measured connected to said test terminals includes the current flowing in a load to be measured and the current flowing in the distributed capacity of the test terminals; and
   means within said probe coupled to one of the test terminals and responsive to current flowing in said signal conductive means is provided to decrease the first output by an amount related to the current flowing in the distributed capacity.

3. Apparatus as in claim 1 comprising:
   a current transformer within said probe coupled to said signal conducting means adjacent one of said test terminals for producing said first output in response only to the current flowing through the load to be measured connected to said test terminals; and
   means connected to said signal conducting means at a point thereon adjacent said one of the test terminals on the source side of said current transformer for producing said second output in response to the voltage across said test terminals.

4. Apparatus as in claim 3 wherein the current flowing through the load to be measured connected to said test terminals includes the current flowing in a load to be measured and the current flowing in the distributed capacity of the test terminals; and
   there is provided a compensating winding on said current transformer and a capacitor serially connected with the compensating winding poled to oppose the flux produced by coupling to the signal conducting means.

5. Apparatus as in claim 3 comprising:
   a source of reference signal;
   means connected to receive the reference signal and first output for producing an error signal related to the combination of said reference signal and the first output;
   means connected to apply said error signal to the source for altering the amplitude of the alternating signal to maintain the load current substantially constant; and
   indicating means connected to receive the second output for providing an indication of the impedance of the load to be measured connected to said test terminals.

References Cited by the Examiner

UNITED STATES PATENTS

| 2,728,048 | 12/1955 | Priedigkeit | 324—57 |
| 2,762,971 | 9/1956 | Parker | 324—57 |
| 2,793,292 | 5/1957 | Wolff | 324—57 |
| 2,793,343 | 5/1957 | Wagner | 324—57 |
| 2,839,723 | 6/1958 | DeArmond | 324—57 |
| 3,049,666 | 8/1962 | Anderson | 324—57 |

WALTER L. CARLSON, *Primary Examiner.*

W. H. BUCKLER, E. E. KUBASIEWICZ,
*Assistant Examiners.*